G. P. CHARTERS & C. A. DOZIER.
DEVICE FOR APPLYING ANTISKID CHAINS.
APPLICATION FILED SEPT. 24, 1915.
1,176,650.
Patented Mar. 21, 1916.
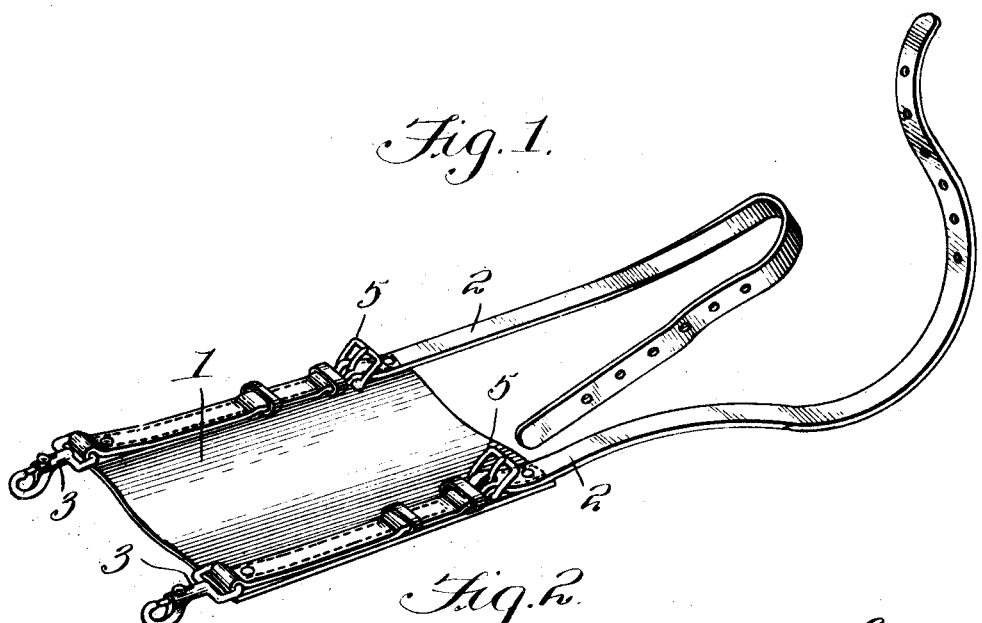
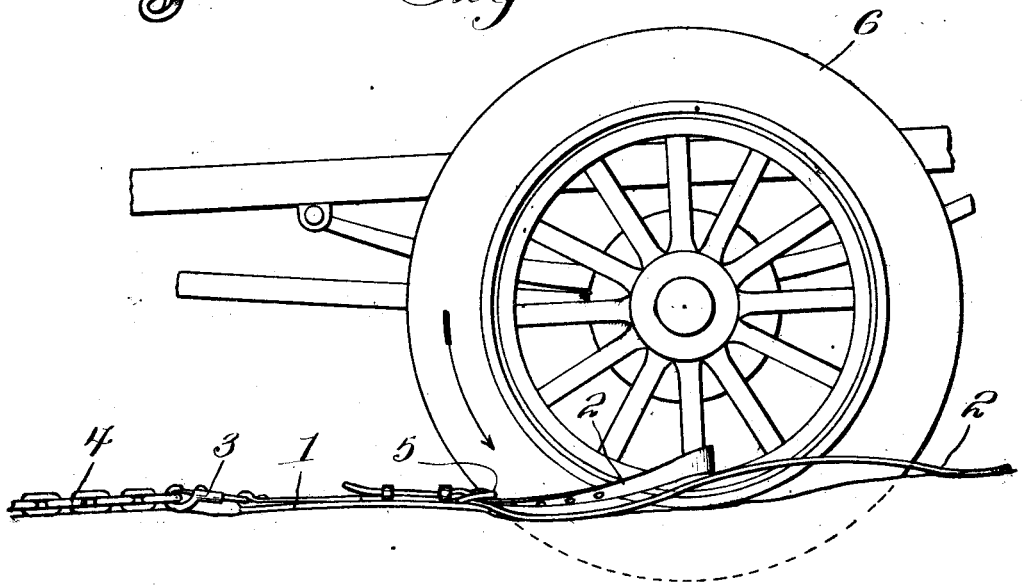

UNITED STATES PATENT OFFICE.

GEORGE P. CHARTERS AND CADMUS A. DOZIER, OF GAINESVILLE, GEORGIA.

DEVICE FOR APPLYING ANTISKID-CHAINS.

1,176,650.

Specification of Letters Patent.

Patented Mar. 21, 1916.

Application filed September 24, 1915. Serial No. 52,488.

*To all whom it may concern:*

Be it known that we, GEORGE P. CHARTERS and CADMUS A. DOZIER, citizens of the United States, residing at Gainesville, in the county of Hall and State of Georgia, have invented new and useful Improvements in Devices for Applying Antiskid-Chains, of which the following is a specification.

This invention relates to devices for applying anti-skid chains to the tires of vehicles, the object in view being to provide means whereby an anti-skid chain may be adjusted in proper relation to and fastened upon a vehicle wheel tire particularly after the vehicle becomes mired.

Under the present day practice, chains are ordinarily applied to the wheels of an automobile or similar vehicle before a machine becomes mired, this being done on account of the well known difficulty of and in some cases impossibility of applying the chains to the wheels after the machine becomes mired. By means of the invention hereinafter described, chains may be applied to the tires and wheels with the same ease and readiness after the wheels have become sunken in a soft place, as when such chains are applied to the wheels under normal conditions.

With the above and other objects in view, the invention consists in the novel construction, combination and arrangement of parts, as herein described, illustrated and claimed.

In the accompanying drawings:—Figure 1 is a perspective view of the device of this invention. Fig. 2 is a side elevation of a wheel showing the relation of the device of this invention thereto and an anti-skid chain preparatory to applying the chain to the wheel.

The device for applying an anti-skid chain to a tire comprises a shoe 1 which is preferably of stout flexible material such as leather, the flexibility thereof adapting said shoe, when under strain, to conform to the curvature of the tire both longitudinally and transversely. Extending along opposite sides of the shoe 1 are straps 2 also preferably of leather and flexible, the straps 2 being substantially parallel to each other and sewed, riveted or otherwise firmly fastened to the shoe 1. Each of said straps is provided at one extremity thereof with a hook, preferably a snap hook 3, in order to enable an anti-skid chain indicated at 4 to be attached at two points to the shoe 1.

The straps 2 extend any suitable distance beyond one end of the shoe 1 so that either one or both of said straps may be passed around one or more spokes of the wheel and then extended back again to be secured by means of buckles 5 which are fastened to the straps 2 adjacent to the end of the shoe 1 opposite the hooks 3.

In operation, after a car has become mired, the device of this invention is laid upon the mud just in front of a rear driving wheel with the straps pointing to the rear of the car. One of the straps is then passed around one of the spokes of the wheel and fastened to the buckle of the opposite strap. If desired, both of the straps may be so treated. One end of the anti-skid chain is then attached to the hooks 3 after which power is applied to the wheel indicated at 6 by means of the engine, causing the wheel to revolve and draw the device of this invention under and around the same followed by the anti-skid chain. As soon as the chain has thus been pulled under the wheel and is clear at the rear thereof, the extremities of the chain are fastened together in the usual way and the device of this invention is removed and used in the same way with respect to the other driving wheel at the opposite side of the machine. The use of two straps adds greatly to the convenience of the operator who may grasp the inside strap and pass it between two of the spokes of the wheel and then connect it to the buckle on the outside strap. He may, of course, use both straps in order to effect a more secure fastening of the device to the wheel, should it be found necessary.

The device may, of course, be manufactured in sizes to suit different wheels and tires and any suitable material may be employed in the manufacture of the device.

Having thus described our invention, we claim:—

A device for applying anti-skid chains to vehicle wheels, the same comprising a flexible shoe, means for securing said shoe to a wheel embodying straps fastened to opposite sides of said shoe and extending beyond one end of the shoe, buckles for said straps, and hooks carried by said straps and providing for the attachment of an antiskid chain to said shoe.

In testimony whereof we affix our signatures in presence of two witnesses.

GEORGE P. CHARTERS.
CADMUS A. DOZIER.

Witnesses:
EDGAR D. KENYON,
MARY ANNA MOORE.